United States Patent
Lin et al.

(10) Patent No.: US 8,909,951 B2
(45) Date of Patent: Dec. 9, 2014

(54) POWER MANAGEMENT SYSTEM FOR DYNAMICALLY DOWNGRADING OR UPGRADING THE SPEED OF INDIVIDUAL USB PORTS ON A USB HUB BASED ON AVAILABLE AND REQUESTED POWER

(75) Inventors: Chih-jung Lin, Taoyuan (TW); Wei-te Lee, Banqiao (TW)

(73) Assignee: Genesys Logic, Inc., Shindian (TW)

( * ) Notice: Subject to any disclaimer, the term of this patent is extended or adjusted under 35 U.S.C. 154(b) by 106 days.

(21) Appl. No.: 13/244,320

(22) Filed: Sep. 24, 2011

(65) Prior Publication Data

US 2013/0013936 A1   Jan. 10, 2013

(30) Foreign Application Priority Data

Jul. 4, 2011   (TW) .............................. 100123565 A

(51) Int. Cl.
G06F 1/26   (2006.01)
(52) U.S. Cl.
CPC ..................................... G06F 1/266 (2013.01)
USPC ......................................................... 713/300
(58) Field of Classification Search
CPC ........ G06F 1/26; G06F 13/4022; G06F 1/266
USPC ....................................................... 713/300
See application file for complete search history.

(56) References Cited

U.S. PATENT DOCUMENTS

| 6,798,173 B2 | 9/2004 | Hsu |
| 6,839,778 B1* | 1/2005 | Sartore et al. ................... 710/60 |
| 7,653,772 B2 | 1/2010 | Hayashi et al. |
| 7,882,297 B2* | 2/2011 | Sisto et al. ..................... 710/313 |
| 7,941,677 B2* | 5/2011 | Penning ........................ 713/300 |
| 2007/0055805 A1* | 3/2007 | Hayashi et al. ............... 710/306 |
| 2008/0042616 A1 | 2/2008 | Monks et al. |
| 2009/0100275 A1 | 4/2009 | Chang |
| 2010/0217911 A1 | 8/2010 | Sisto et al. |
| 2011/0273144 A1* | 11/2011 | Yu et al. ........................ 320/162 |
| 2012/0246458 A1* | 9/2012 | Jain et al. ...................... 713/100 |

FOREIGN PATENT DOCUMENTS

| CN | 1928780 | 3/2007 |
| CN | 101840386 | 9/2010 |
| CN | 201766243 | 3/2011 |
| TW | 479393 | 3/2002 |

* cited by examiner

*Primary Examiner* — Thomas Lee
*Assistant Examiner* — Danny Chan

(57) ABSTRACT

A dynamic power management system for USB hub and method thereof are described. The dynamic power management system includes a host device, a power unit and a hub device. A power management module disposed in the hub device dynamically adjusts the power-supplying statuses of ports in the hub device and further reduces the cost of power transformer externally connected to the hub device.

25 Claims, 10 Drawing Sheets

POWER MANAGEMENT SYSTEM FOR DYNAMICALLY DOWNGRADING OR UPGRADING THE SPEED OF INDIVIDUAL USB PORTS ON A USB HUB BASED ON AVAILABLE AND REQUESTED POWER

CROSS REFERENCE TO RELATED APPLICATIONS

This Non-provisional application claims priority under 35 U.S.C. §119(a) on Patent Application No(s). 100123565 filed in Taiwan, Republic of China on Jul. 4, 2011, the entire contents of which are hereby incorporated by reference.

FIELD OF THE INVENTION

The present invention relates to a power management system and method thereof, and more particularly to a dynamic power management system for universal serial bus (USB) hub and method thereof.

BACKGROUND OF THE INVENTION

Recently, the connection ports with universal serial bus (USB) protocol are widely applicable to portable electronic products, e.g. cell phone and digital camera. When these portable electronic products are connected to the hub for use, several execution modes are performed for communication and each of execution modes consumes the current with different magnitude level wherein the supplying current is distributed to each port of the hub. For example, when an electronic product is connected to one port, its execution mode is fixed and the available supplying current is decreased if the more and more electronic products are added. Meanwhile, a new electronic product is put into another port and the consumed current of the electronic product is greater than the available supplying current, the electronic product cannot correctly operate. Even if the previous connected product is removed from the hub, the new product cannot still operate. It is required to remove the new product from the port and reconnect the new product. Such the situation is quite inconvenient since the supplying current corresponding to each port cannot be adjusted correctly.

Although external transformer can be used in the hub to increase the supplying current of the hub, the current from the transformer is limited due to cost consideration. Specifically, when the ports in the hub are increased, the transformer must provide more current for the ports. Therefore, the port amount of conventional hub for the electronic products is considerably limited. That is, since the supplying current of the ports cannot be adjusted, the electronic products lack the flexibility for the user. Consequently, there is a need to develop a novel power management to solve the aforementioned problems.

SUMMARY OF THE INVENTION

One objective of the present invention provides a dynamic power management system for universal serial bus (USB) hub and method thereof to perform the port status conversion based on the enabling or disabling the port status by using the power management module for dynamically adjusting the status conversion associated with the supplying current of the ports and to save the cost of the external power source, e.g. transformer, of the hub device.

Another objective of the present invention provides a dynamic power management system for universal serial bus (USB) hub and method thereof. The dynamic power management system includes a host device, a power unit and a hub device. The power unit provides a supplying current. The USB hub device establishes a communication link to the host device and receives the supplying current from the power unit. In another embodiment, the host device may be another USB hub device so that USB hub device can receive the commands from or transmit the messages to the upstream host device via another USB hub device.

The USB hub device further includes a plurality of ports, a power management module and the hub function module. The ports have an upstream port and a plurality of downstream ports wherein the host device is coupled to the USB hub device via the upstream port.

The power management module receives the supplying current and calculates an available current based on the supplying current. The available current is generated by computing the supplying current, the request current of the peripheral and a consumed current of the hub function module. Specifically, the available current is equal to the difference between the supplying current and consumed current with respect to request current. That is, the available current is to subtract the consumed current of the peripheral devices and the USB hub device from the supplying current wherein the request current is generating when the USB hub device inquires the host device.

The hub function module detects and manages the usage status of the ports. In other words, the hub function module detects whether the ports are in either enable or disable status so that the host device communicates with the peripheral devices and manages the peripheral devices connected to the downstream ports.

The power management module compares the available current with a request current of the peripheral device to determine whether the available current is greater than the request current when a peripheral device is connected to one of the downstream ports. Further, the hub function module determines an execution mode of the port connected to the peripheral device based on the compared result between the available current and the request current.

In the present invention, a dynamic power management method for universal serial bus (USB) hub, which is applicable to a dynamic power management system, wherein the dynamic power management system comprises a host device, a power unit generating a supplying current, a hub device coupled to the host device and the power unit, and the hub device has a power management module, a hub function module and a plurality of ports, the method comprising the steps of:

(a) activating a USB hub device;

(b) establishing a communication link between the USB hub device and a host device;

(c) calculating an available current of the USB hub device based on a supplying current by the power management module;

(d) detecting whether an added peripheral device is connected to one of a plurality of ports of the USB hub device by the hub function module, if yes, proceed to step (e) and if no, proceed to (d);

(e) acquiring a request current of the added peripheral device by the power management module;

(f) comparing the available current with the request current by the power management module for determining whether the available current is less than the request current, if yes, proceed to step (g) and if no, proceed to step (h);

(g) reconnecting the added peripheral device to one of the ports by the hub function module, downgrading an execution mode of the port connected to the added peripheral device, and returning to the step (e); and (h) completing the connection between the added peripheral device and the USB hub device.

The present invention provides a dynamic power management system for universal serial bus (USB) hub and method thereof to perform the port status conversion based on the enabling or disabling the port status by using the power management module for dynamically adjusting the status conversion associated with the supplying current of the ports and to save the cost of the external power source, e.g. transformer, of the hub device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
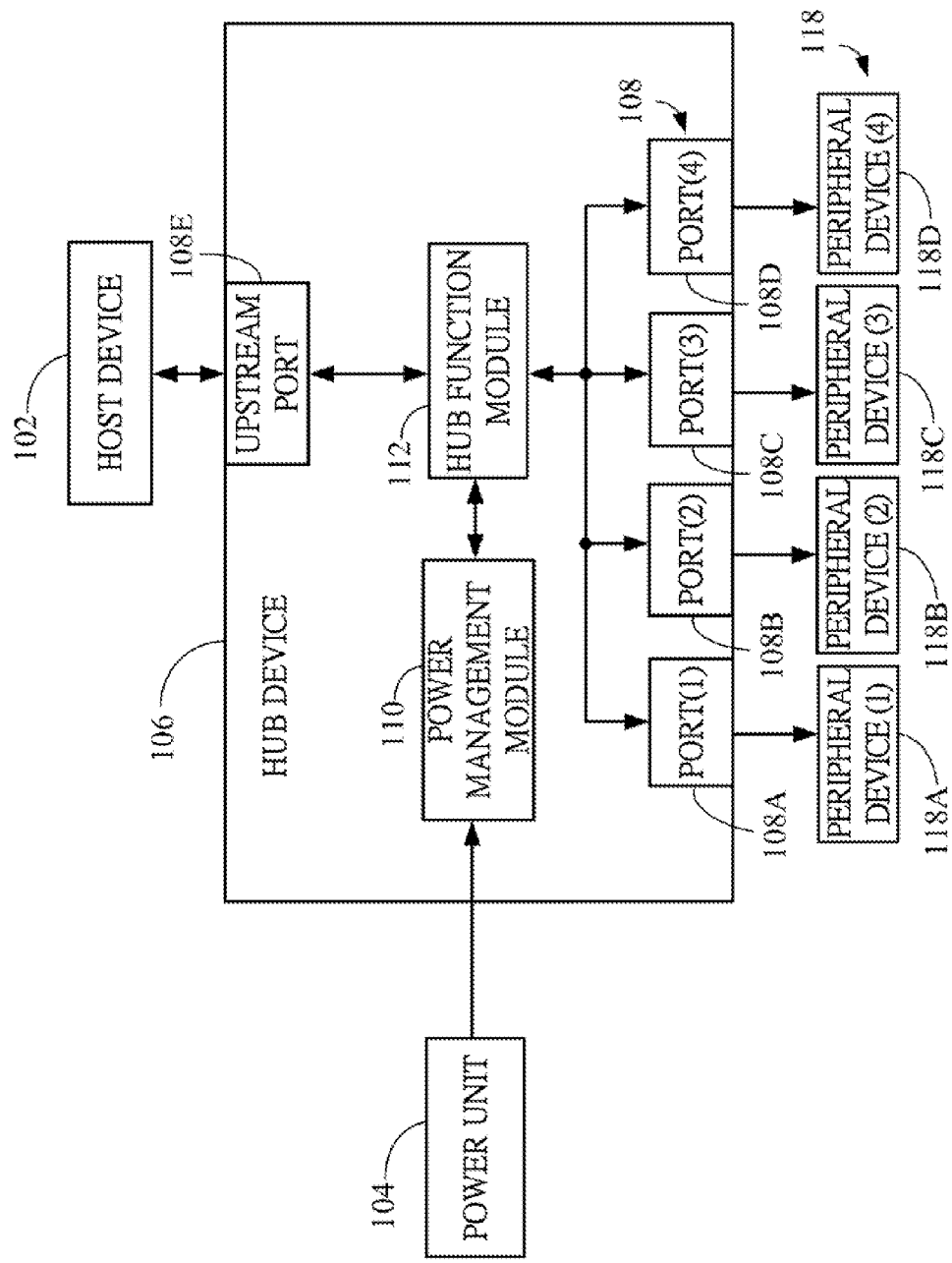
FIG. 1A is a schematic block diagram of a dynamic power management system for universal serial bus (USB) hub according to a first embodiment of the present invention.

FIG. 1A is a schematic block diagram of a dynamic power management system 100A for universal serial bus (USB) hub according to a first embodiment of the present invention. The dynamic power management system 100A includes a host device 102, a power unit 104 and a hub device 106, e.g. a universal serial bus (USB) hub device. The USB hub device 106 is coupled to the host device 102 and the power unit 104, respectively. The power unit 104 may be an external power source and/or battery for providing a supplying current. The USB hub device 106 establishes a communication link to the host device 102 and receives the supplying current from the power unit 104. In another embodiment, the host device 102 may be another USB hub device (not shown) so that USB hub device 106 can receive the commands from or transmit the messages to the upstream host device (not shown) via another USB hub device (not shown).

The USB hub device 106 further includes a plurality of ports 108, a power management module 110 and the hub function module 112. The hub function module 112 is coupled to the power management module 110 and the plurality of ports 108, respectively. The ports 108 have an upstream port 108E and a plurality of downstream ports 108A~108D wherein the host device 102 is coupled to the USB hub device 106 via the upstream port 108E. In this case, the ports 108 is composed of an upstream port 108E and four downstream ports 108A~108D, but not limited. A plurality of peripheral devices 118 are connected to the USB hub device 106 via the downstream ports 108A~108D.

The power management module 110 receives the supplying current and calculates an available current based on the supplying current. The available current is generated by computing the supplying current, the request current of the peripheral 118 and a consumed current of the hub function module 112. Specifically, the available current is equal to the difference between the supplying current and consumed current with respect to request current. That is, the available current is to subtract the consumed current of the peripheral devices 118 and the USB hub device 106 from the supplying current wherein the request current is generating when the USB hub device 106 inquires the host device 102.

The hub function module 112 detects and manages the usage status of the ports 108. In other words, the hub function module 112 detects whether the ports are in either enable or disable status so that the host device 102 communicates with the peripheral devices 118 and manages the peripheral devices 118 connected to the downstream ports 108A~108D.

The power management module 110 compares the available current with a request current of the peripheral device 118 to determine whether the available current is greater than the request current when a peripheral device 118 is connected to one of the downstream ports 108A~108D. Further, the hub function module 112 determines an execution mode of the port 108 connected to the peripheral device 118 based on the compared result between the available current and the request current. The execution mode is selected from one group consisting of a SuperSpeed mode, a High-Speed mode, a Full-Speed mode and a LowSpeed mode, which are compatible to USB protocol. In one embodiment, the execution mode of the port 108 may be one of a plurality of predetermined current intervals. For example, a first predetermined current interval is lower than 0.1 ampere (A), a second predetermined current interval is between 0.1 and 0.3 ampere (A), a third predetermined current interval is between 0.3 and 0.5 ampere (A), and a fourth predetermined current interval is between 0.5 and 0.9 ampere (A), but not limited.

Figure 1B:
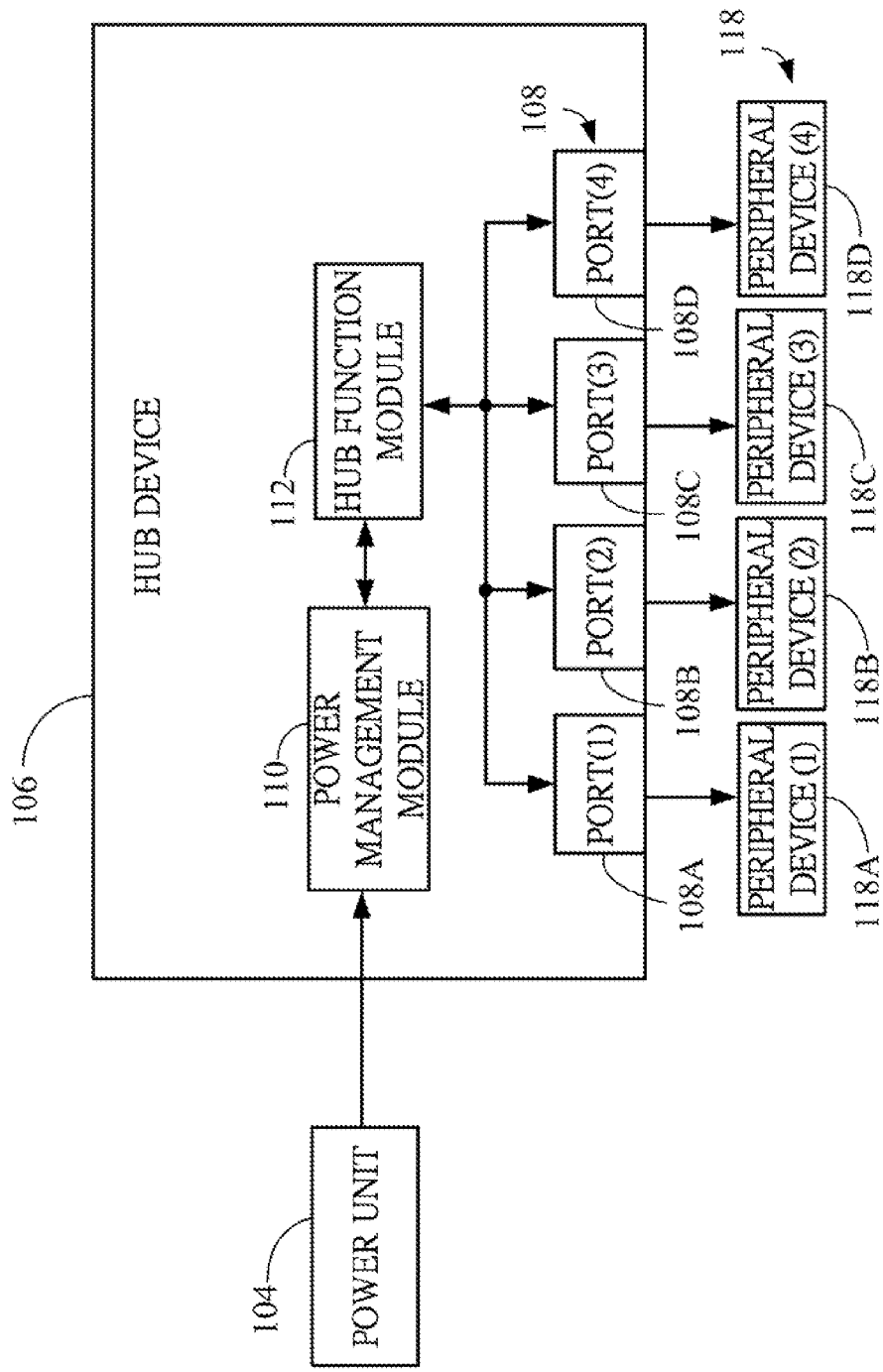
FIG. 1B is a schematic block diagram of a dynamic power management system for universal serial bus (USB) hub according to a second embodiment of the present invention.

FIG. 1B is a schematic block diagram of a dynamic power management system 100B for universal serial bus (USB) hub according to a second embodiment of the present invention. The dynamic power management system 100B in FIG. 1B is similar to the dynamic power management system 100A in FIG. 1A. The difference is that the host device 102 and the upstream port 108E in the dynamic power management system 100B are omitted and the power unit 104 only provides the supplying current to the USB hub device 106. In one case, the USB hub device 106 may be a USB hub compound or USB OTG (on-the-go) device. The rest of the components of the dynamic power management system 100B are the same as these of the dynamic power management system 100A, which are omitted here.

Figure 2A:
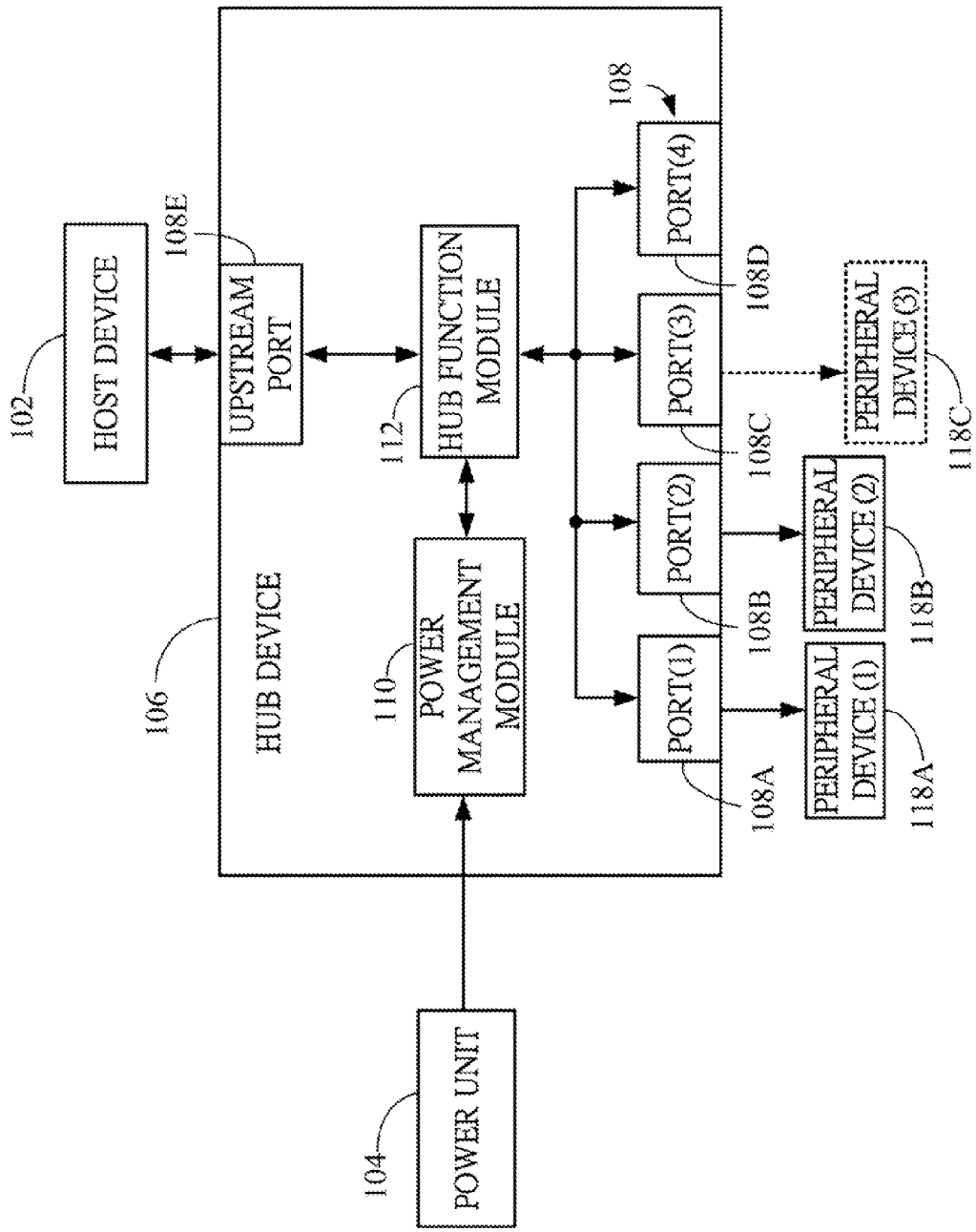
FIG. 2A is a schematic block diagram of a dynamic power management system for universal serial bus (USB) hub and the downgraded execution mode thereof according to one embodiment of the present invention.
Figure 3A:
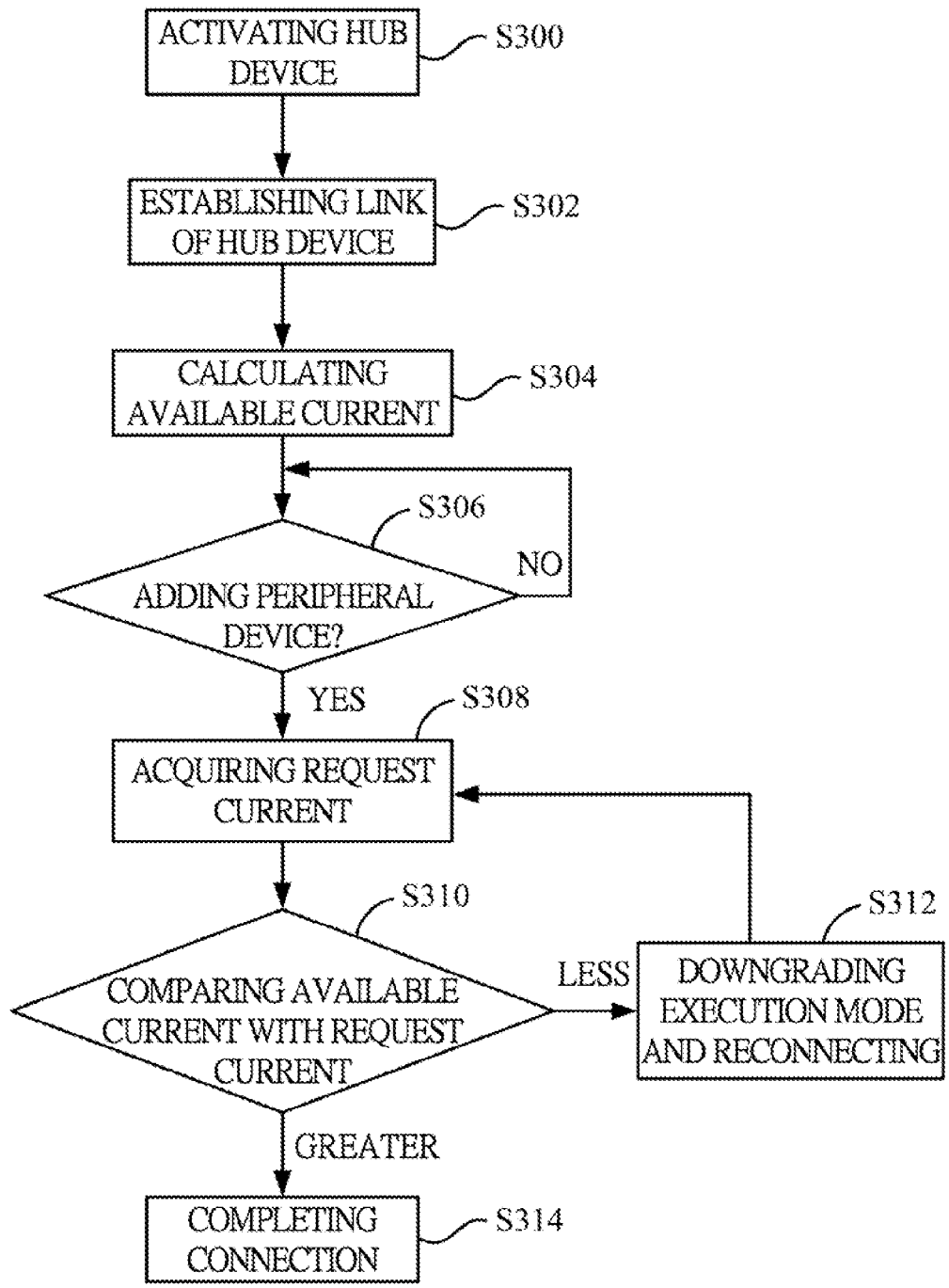
FIG. 3A is a flow chart of a dynamic power management method for universal serial bus (USB) hub and the downgraded execution mode according to one embodiment of the present invention.

Please refer to FIG. 2A and FIG. 3A. FIG. 2A is a schematic block diagram of a dynamic power management system 100A for universal serial bus (USB) hub and the downgraded execution mode thereof according to one embodiment of the present invention. FIG. 3A is a flow chart of a dynamic power management method for universal serial bus (USB) hub and the downgraded execution mode according to one embodiment of the present invention.

The dynamic power management method for universal serial bus (USB) hub is applicable to a dynamic power management system 100A, wherein the dynamic power management system 100A includes a host device 102, a power unit 104 generating a supplying current, and a hub device 106 coupled to the host device 102 and the power unit 104. The hub device 106 has a power management module 110, a hub function module 112 and a plurality of ports 108. The dynamic power management method includes the following steps.

In step S300, a USB hub device 106 is activated.

In step S302, a communication link between the USB hub device 106 and a host device 102 is established.

In step S304, the power management module 110 calculates an available current of the USB hub device 106 based on a supplying current.

In one embodiment, as shown in FIG. 2A, the supplying current generated from the power unit 204 is 2.5 ampere (A), the consumed current of the power management module 110 is 0.1 ampere (A), and the consumed current of the first peripheral device 118A and the second peripheral device 118B are 0.9 ampere (A), respectively, which are operated in a SuperSpeed mode. Thus, the available current of the USB hub device 106 calculated by the power management module 110 based on the supplying current is 0.6 ampere (A).

In step S306, the hub function module 112 detects whether a newly added peripheral device 118 is connected to one of a plurality of ports 108 of the USB hub device 106. If yes, proceed to step S308 and if no, continuously perform the step S306. As shown in FIG. 2A, the hub function module 112 detects that the added third peripheral device 118C is connected to the third port 108C wherein the first and second peripheral devices 118A, 118B are connected to the first and second ports 108A, 108B, respectively.

In step S308, the power management module 110 acquires a request current of the added peripheral device 118. As shown in FIG. 2A, the power management module 110 acquires a request current, e.g. 0.9 ampere (A) of the added peripheral device 118C.

In step S310, the power management module 110 compares the available current with the request current for determining whether the available current is less than the request current. If yes, proceed to step S312 and if no, proceed to step S314.

In step S312, the hub function module 110 reconnects the added peripheral device 118 to one of the ports and downgrades an execution mode of the port 108 connected to the added peripheral device 118. The step S308 is returned. As shown in FIG. 2A, since the available current 0.6 ampere (A) is less than the request current 0.9 ampere (A), the execution mode of the third port 108C connected to the third peripheral device 118C is downgraded. For example, the higher execution mode with the SuperSpeed mode is downgraded to the lower execution mode with the High-Speed mode and the hub function module 110 reconnects the third peripheral device 118C via the third port 108C. Meanwhile, because the third port 108C does not support the higher execution mode with the SuperSpeed mode, the third peripheral device 118C is connected to the USB hub device 106 with the High-Speed mode based on USB protocol wherein the request current of the peripheral device 118C is 0.5 ampere (A) which is less than the available current 0.6 ampere (A).

In one embodiment, as shown in FIGS. 2A and 3A and according to the compared result in step S310 and the descriptions in step S312, the hub function module 110 compares the available current 0.6 (A) with the request current 0.9 (A) and the compared result is that the available current 0.6 (A) is less than the request current 0.9 (A). Meanwhile, the first port 108A and the second port 108B are capable of providing the first peripheral device 118A and the second peripheral device 118B with their request current. That is, the standard execution modes of the first port 108A and the second port 108B correspond to the request current of the first peripheral device 118A and the second peripheral device 118B so that the first peripheral device 118A and the second peripheral device 118B operate in standard execution modes. For example, the standard execution mode, SuperSpeed mode, maps to the request current 0.9 (A). Further, when the third peripheral device 118C is connected to the third port 108C, the third port 108C cannot provide the third peripheral device 118C with the request current but can provide a low current which is lower than the request current of third peripheral device 118C. Thus, the low current corresponds to the downgraded execution mode of the third port 108C so that the third peripheral device 118C operates in downgraded execution mode, e.g. High-Speed mode.

In another embodiment, as shown in FIGS. 2A and 3A, when the compared result is that the available current greater than the request current, the third port 108C is capable of providing the third peripheral device 118C with the request current. That is, standard execution mode supported by the third port 108C corresponds to the request current of the third peripheral device 118C so that the third peripheral device 118C operates in standard execution mode, e.g. SpuerSpeed mode with the request current 0.9 (A).

Therefore, the dynamic power management system 100A of the present invention performs the steps of the downgraded execution mode based on the compared result between the available current and the request current for dynamically adjusting the status conversion associated with the supplying current of the ports 108.

In step S314, the connection between the added peripheral device 118 and the USB hub device 106 is complete. As shown in FIG. 2A, the connection between the first peripheral device 118C and the USB hub device 106 is complete.

Figure 2B:
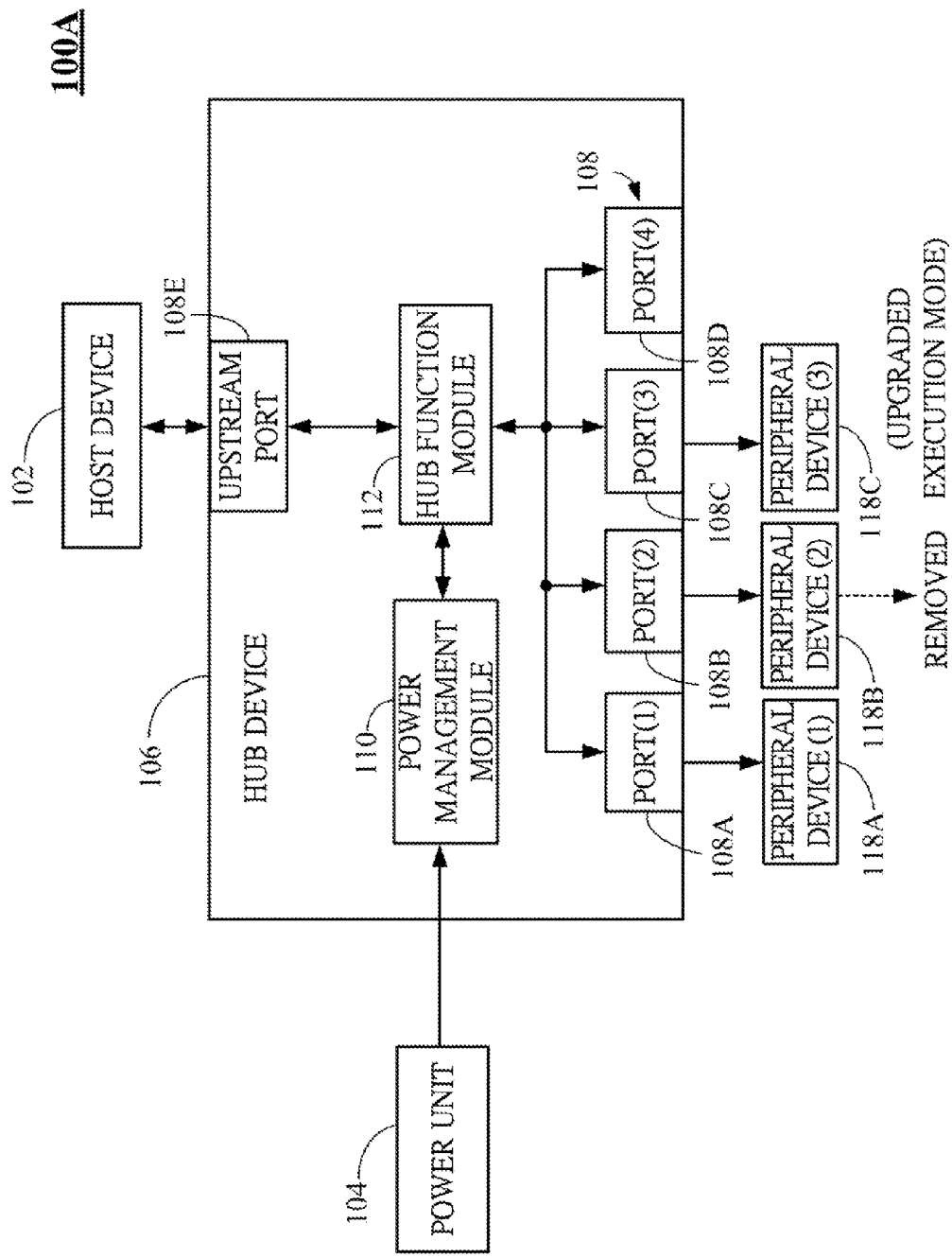
FIG. 2B is a schematic block diagram of a dynamic power management system for universal serial bus (USB) hub and the upgraded execution mode thereof according to one embodiment of the present invention.
Figure 3B:
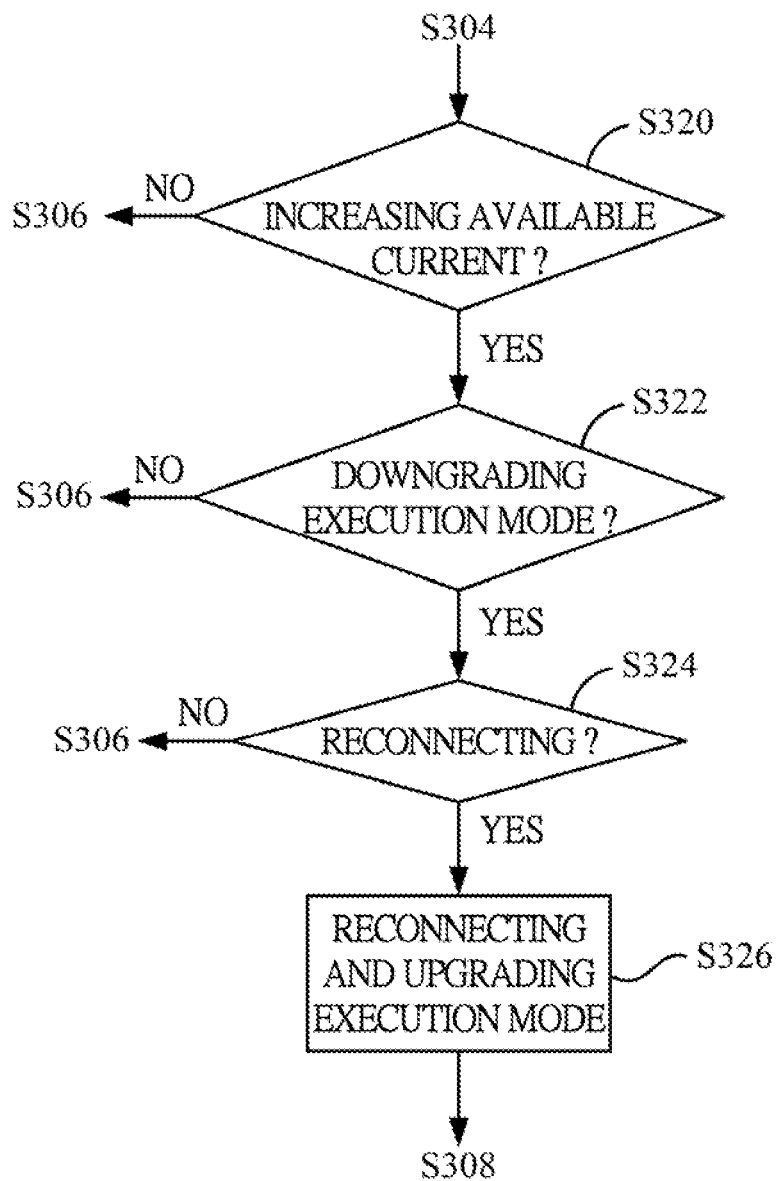
FIG. 3B is a flow chart of a dynamic power management method for universal serial bus (USB) hub and the upgraded execution mode according to one embodiment of the present invention.

Please refer to FIGS. 2B and 3B. FIG. 2B is a schematic block diagram of a dynamic power management system 100A for universal serial bus (USB) hub and the upgraded execution mode thereof according to one embodiment of the present invention. FIG. 3B is a flow chart of a dynamic power management method for universal serial bus (USB) hub and the upgraded execution mode according to one embodiment of the present invention. For an example of FIG. 2A, the first port 108A, the second port 108B and the third port 108C are connected to the first peripheral device 118A, the second peripheral device 118B and the third peripheral device 118C wherein the first port 108A and the second port 108B are capable of providing the first peripheral device 118A and the second peripheral device 118B with the request current respectively. That is, the standard execution modes of the first port 108A and the second port 108B correspond to the request current of the first peripheral device 118A and the second peripheral device 118B so that the first peripheral device 118A and the second peripheral device 118B operate in standard execution modes. For example, the standard execution mode, SuperSpeed mode, maps to the request current 0.9 (A). Further, the third port 108C cannot provide the third peripheral device 118C with the request current but can provide a low current which is lower than the request current of third peripheral device 118C. Thus, the low current corresponds to the downgraded execution mode of the third port 108C so that the third peripheral device 118C operates in downgraded execution mode, e.g. High-Speed mode.

In one case of FIG. 3B, the dynamic power management method further includes the following steps after the step S304 (shown in FIG. 3A).

In step S320, the power management module 110 determines whether the available current is increased. If yes, proceed to step S322 and if no, proceed to step S306. As shown in FIG. 2B, the available current has the increment of 0.9 (A) when the second peripheral device 118B is removed from the second port 108B.

In step S322, the hub function module 112 checks whether another port of the USB hub device connected to another peripheral device 118 is executed in a downgraded execution mode. If yes, proceed to the step S324 and if no, proceed to the step S306. As shown in FIG. 2B, the third peripheral device 118C is connected to the third port 108C of the USB hub device 106 and operated in downgraded execution mode, e.g. High-Speed mode and the step S324 proceeds.

In step S324, the hub device 106 inquires a user whether another peripheral device 118 is reconnected. If yes, proceed to the step S326 and if no, proceed to the step S306. As shown in FIG. 2B, the hub device 106 inquires a user whether the third peripheral device 118C is reconnected and it is required to reconnect the third peripheral device 118C.

In step S326, the hub function module 112 upgrades the downgraded execution mode of another port 108 of the USB hub device 106 connected to another peripheral device 118, reconnects another peripheral device 118 to one of the ports 108 and return to the step S308. As shown in FIG. 2B, the hub function module 112 upgrades the downgraded execution mode, e.g. High-Speed mode, of the third port 108C of the third peripheral device 118C to the upgraded execution mode, e.g. SuperSpeed mode. Therefore, the dynamic power management system 100A of the present invention performs the steps of the downgraded execution mode based on the compared result between the available current and the request current for dynamically adjusting the status conversion associated with the supplying current of the ports 108 of the hub device 106. It should be noted that the procedure of the upgraded execution mode in FIG. 3B can be performed after the step S314 in FIG. 3A.

Figure 2C:
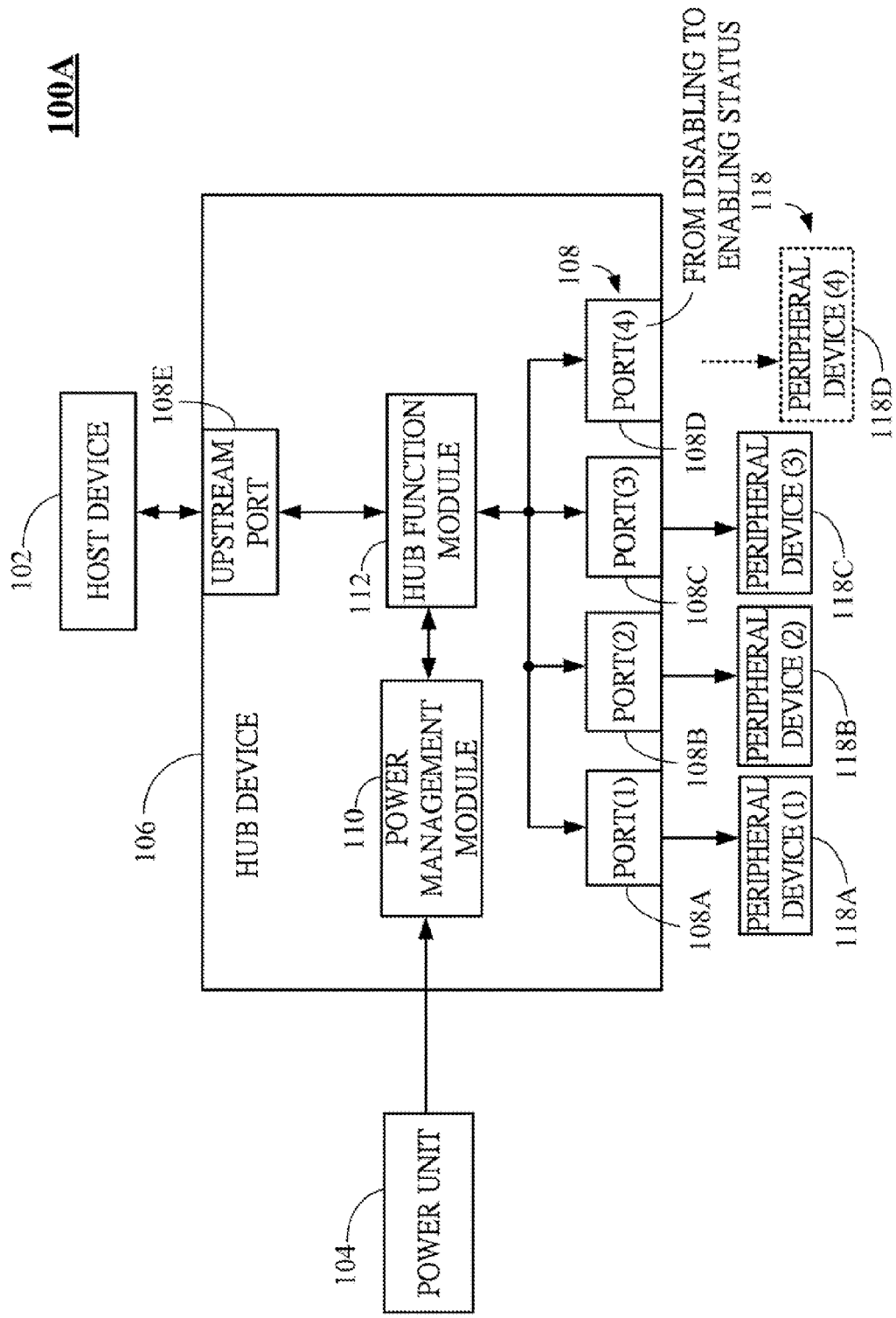
FIG. 2C is a schematic block diagram of a dynamic power management system for universal serial bus (USB) hub and the status conversion of ports thereof according to one embodiment of the present invention.
Figure 3C:
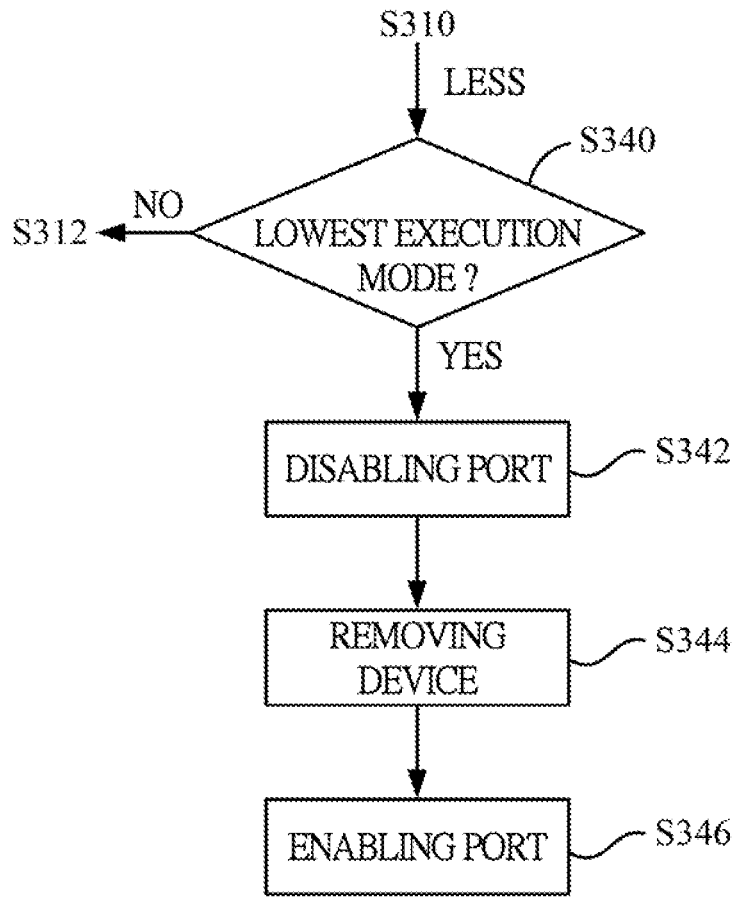
FIG. 3C is a flow chart of performing the port status conversion according to one embodiment of the present invention.

Please refer to FIGS. 2C and 3C. FIG. 2C is a schematic block diagram of a dynamic power management system 100A for universal serial bus (USB) hub and the port status conversion thereof according to one embodiment of the present invention. FIG. 3C is a flow chart of performing the port status conversion according to one embodiment of the present invention. In one embodiment of FIG. 2C, the supplying current from the power unit 104 is 2.5 (A), the consumed current of the hub function module 110 is 0.05 (A), and the consumed current of the first, second and third peripheral devices 118A, 118B and 118C, respectively in the execution mode of SuperSpeed is 0.8 (A). Thus, the available current of the USB hub device 106 calculated by the power management module 110 based on the supplying current is 0.05 (A).

In one embodiment of FIG. 3C, the dynamic power management method further includes the following steps after the step S310 (shown in FIG. 3A), i.e. after the power management module 110 compares the available current with the request current and the compared result is that the available current is less than the request current.

In step S340, the hub function module 112 determines whether the added peripheral device 118 downgrades to a lowest execution mode. If yes, proceed to the step S342 and if no, proceed to the step S312. As shown in FIG. 3C, the hub function module 112 determines that the fourth peripheral device 118D downgrades to a lowest execution mode, wherein the fourth peripheral device 118D supports three kinds of execution modes including SuperSpeed mode, High-Speed mode and FullSpeed mode, and its request current is the lowest execution mode with FullSpeed mode.

In step S342, the hub function module 112 disables the port 108 connected to the added peripheral device 118. As shown in FIG. 3C, since the available current 0.05 (A) is far lower than the request current corresponding to the FullSpeed mode, the fourth port 108D connected to the fourth peripheral device 118D is disabled.

In step S344, the added peripheral device 118 is removed. As shown in FIG. 3C, the fourth peripheral device 118D is removed from the fourth port 108D.

In step S346, the hub function module 112 enables the port 108 connected to the removed added peripheral device 118. As shown in FIG. 3C, after the fourth peripheral device 118D is removed, the fourth port 108D connected to the fourth peripheral device 118D is enabled so that the fourth port 108D can be provided for other peripheral device. Therefore, the dynamic power management system 100A of the present invention performs the port status conversion based on the enabling or disabling status of the ports 108 for dynamically adjusting the status conversion associated with the supplying current of the ports 108. It should be noted that the procedure of the port status conversion in FIG. 3C can be performed after the step S314 in FIG. 3A.

Figure 2D:
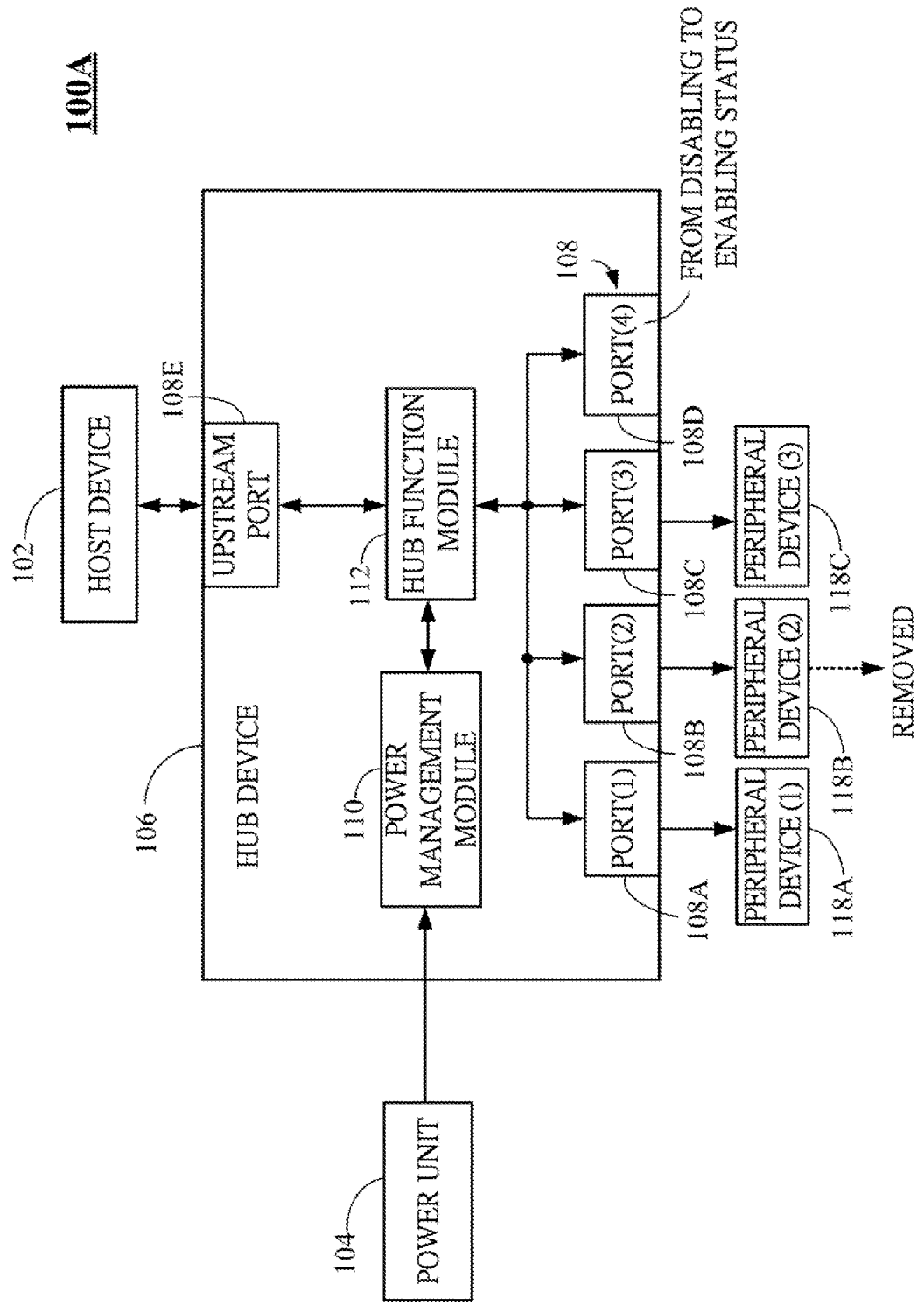
FIG. 2D is a schematic block diagram of a dynamic power management system for universal serial bus (USB) hub and the status conversion of ports thereof according to another embodiment of the present invention.
Figure 3D:
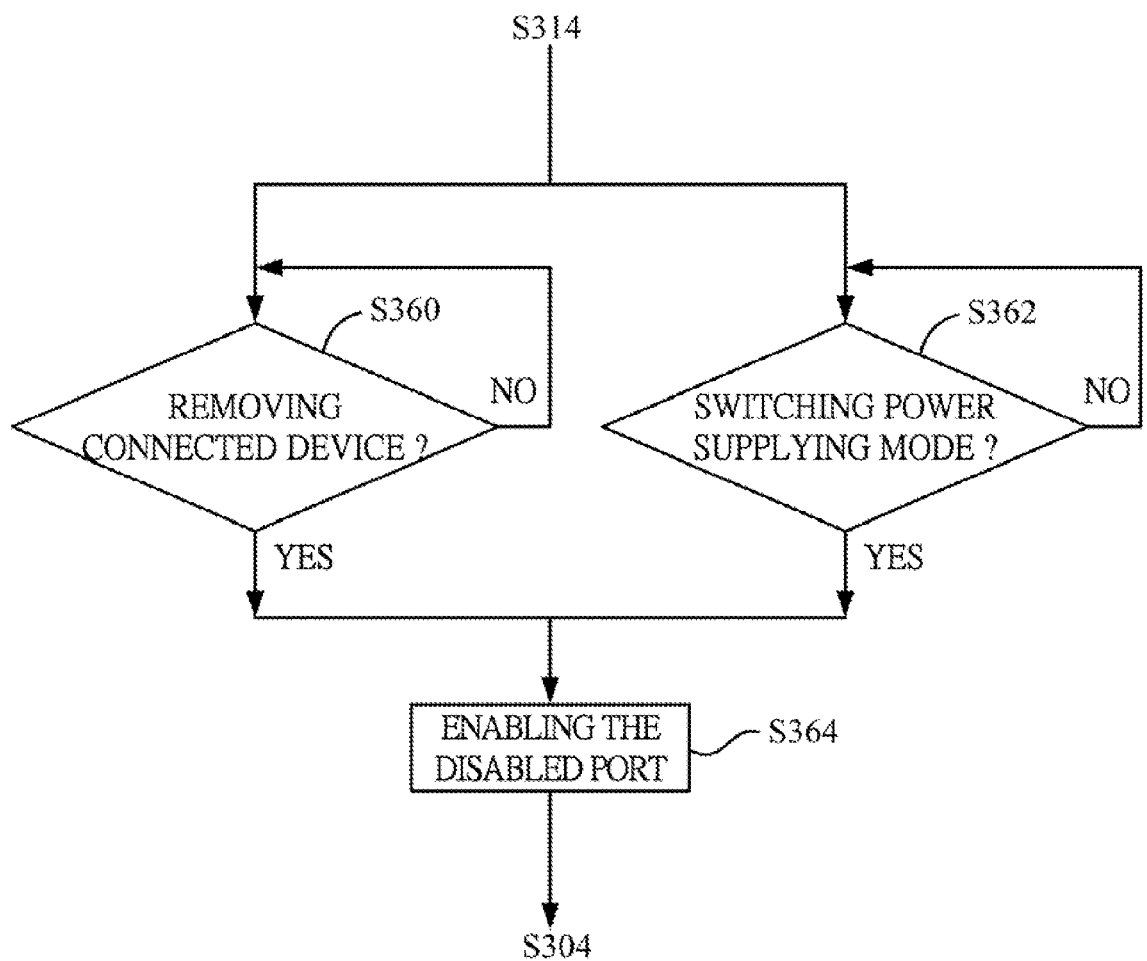
FIG. 3D is a flow chart of performing the port status conversion according to another embodiment of the present invention.

Please refer to FIGS. 2D and 3D. FIG. 2D is a schematic block diagram of a dynamic power management system 100A for universal serial bus (USB) hub and the status conversion of ports thereof according to another embodiment of the present invention. FIG. 3D is a flow chart of performing the port status conversion according to another embodiment of the present invention. In one embodiment of FIG. 2D, the supplying current from the power unit 104 is 2.5 (A), the consumed current of the hub function module 110 is 0.05 (A), and the consumed current of the first, second and third peripheral devices 118A, 118B and 118C, respectively in the execution mode of SuperSpeed is 0.8 (A). Thus, the available current of the USB hub device 106 calculated by the power management module 110 based on the supplying current is 0.05 (A).

In one embodiment of FIG. 3D, the dynamic power management method further includes the following steps after the step S314 (shown in FIG. 3A), i.e. after the connections between the added peripheral devices 118A, 118B, 118c and the USB hub device 106 are complete.

In step S360, the hub function module 112 checks whether the added peripheral device 118 is removed. If yes, proceed to the step S364 and if no, continuously perform the step S360. As shown in FIG. 3D, the hub function module 112 checks whether at lest one of the first, second and third peripheral devices 118A, 118B, 118C is removed. For example, the second peripheral device 118B is removed.

In step S364, the hub function module 112 enables the disabled port 108 connected to the removed added peripheral device 118 and returns to the step S304 (shown in FIG. 3A). As shown in FIG. 3D, the hub function module 112 enables the disabled fourth port 108D connected to the removed fourth peripheral device 118D wherein the fourth port 108D is disabled originally.

In another embodiment of FIG. 3D, the dynamic power management method further includes the following steps after the step S314 (shown in FIG. 3A), i.e. after the connections between the added peripheral devices 118A, 118B, 118c and the USB hub device 106 are complete.

In step S362, the hub function module 112 checks whether a power supplying mode of the added peripheral devices 118 are switched. If yes, proceed to the step S364 and if no, continuously perform the step S362. As shown in FIG. 3D, the hub function module 112 checks whether a power supplying mode of the added peripheral devices 118A, 118B, 118C are switched. If the hub device 106 provides the power for the peripheral devices 118, it is termed as bus power mode and if external power source, e.g. battery, provides the power for the peripheral devices 118, it is defined as self power mode. The hub function module 112 checks whether the bus power mode and the self power mode of the peripheral devices 118 are switched.

In step S364, the hub function module 112 enables the disabled port 108 connected to the added peripheral device 118 associated with the switched power supplying mode. Therefore, the dynamic power management system 100A of the present invention performs the port status conversion based on the enabling or disabling status of the ports 108 for dynamically adjusting the status conversion associated with the supplying current of the ports 108. It should be noted that the procedure of the port status conversion in FIG. 3D can be performed after the step S314 in FIG. 3A.

Based on the above descriptions, the dynamic power management system for universal serial bus (USB) hub and method thereof to perform the port status conversion based on the enabling or disabling the port status by using the power management module for dynamically adjusting the status conversion associated with the supplying current of the ports and to save the cost of the external power source, e.g. transformer, of the hub device. The dynamic power management system performs downgraded execution mode, upgraded execution mode and port status conversion based on power supplying capability of the power unit for dynamically adjusting the port status conversion.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A dynamic power management system for universal serial bus (USB) hub, the dynamic power management system comprising:
   a host device;
   a power unit, generating a supplying current; and
   a USB hub device coupled to the host device and the power unit, establishing a communication link to the host device and receiving the supplying current, the USB hub device comprising:
   a plurality of ports having a upstream port and a plurality of downstream ports wherein the host device is coupled to the USB hub device via the upstream port;
   a power management module, receiving the supplying current and calculating an available current based on the supplying current; and
   a hub function module coupled to the power management module and the ports respectively, detecting and managing the ports;
   wherein the power management module compares the available current with a request current of a peripheral device when the peripheral device is connected to one of the ports and the hub function module determines an execution mode of the port connected to the peripheral device based on the compared result between the available current and the request current, and wherein the power management module acquires the request current when the USB hub device inquires the host device; and
   wherein if the available current is less than the request current, the execution mode of the port connected to the peripheral device is downgraded and the peripheral device is reconnected to the one of the ports, the power management module acquires the request current when the USB hub device inquires the host device again.

2. The dynamic power management system of claim 1, wherein the available current is generated by computing the supplying current, the request current and a consumption current of the hub function module.

3. The dynamic power management system of claim 1, wherein the hub function module further enables and disables the ports for managing the ports.

4. The dynamic power management system of claim 1, wherein the execution mode is selected from one group consisting of a SuperSpeed mode, a High-Speed mode, a Full-Speed mode and a LowSpeed mode compatible to USB protocol.

5. A universal serial bus (USB) hub with dynamic power management which is connected to at least one peripheral device, the USB hub comprising:
   a plurality of ports, connecting the peripheral device to one of the ports;
   a hub function module coupled to the ports, detecting and managing the ports; and
   a power management module coupled to the hub function module, receiving a supplying current and calculating an available current based on the supplying current;
   wherein the power management module compares the available current with a request current of the peripheral device and the hub function module determines an execution mode of the port connected to the peripheral device based on the compared result between the available current and the request current, and wherein the power management module acquires the request current when the USB hub device inquires the host device; and
   wherein if the available current is less than the request current, the execution mode of the port connected to the peripheral device is downgraded and the peripheral device is reconnected to the one of the ports, the power management module acquires the request current when the USB hub device inquires the host device again.

6. The USB hub of claim 5, wherein the available current is generated by computing the supplying current, the request current and a consumption current of the hub function module.

7. The USB hub of claim 5, wherein the hub function module further enables and disables the ports for managing the ports.

8. The USB hub of claim 5, wherein the execution mode is selected from one group consisting of a SuperSpeed mode, a High-Speed mode, a FullSpeed mode and a LowSpeed mode compatible to USB protocol.

9. The USB hub of claim 5, wherein the supplying current is provided by a power source connected to the power management module.

10. The USB hub of claim 5, wherein the supplying current is provided by a host device which is coupled to the hub function module via a upstream port of the ports.

11. A dynamic power management method for universal serial bus (USB) hub, the method comprising the steps of:
   (a) activating a USB hub device;
   (b) establishing a communication link between the USB hub device and a host device;
   (c) calculating an available current of the USB hub device based on a supplying current;
   (d) detecting whether an added peripheral device is connected to one of a plurality of ports of the USB hub device, if yes, proceed to step (e) and if no, proceed to (d);
   (e) acquiring information regarding a request current of the added peripheral device, and wherein the power management module acquires the request current when the USB hub device inquires the host device;
   (f) comparing the available current with the request current for determining whether the available current is less than the request current, if yes, proceed to step (g) and if no, proceed to step (h);
   (g) downgrading an execution mode of the port connected to the added peripheral device, reconnecting the added peripheral device to the one of the ports, and returning to the step (e); and
   (h) completing the connection between the added peripheral device and the USB hub device.

12. The method of claim 11, after the step (c), further comprising the steps of:
   (c1) determining whether the available current is increased, if yes, proceed to step (c2) and if no, proceed to step (d);
   (c2) checking whether another port of the USB hub device connected to another peripheral device is executed in a downgraded execution mode; and
   (c3) upgrading the downgraded execution mode of another port of the USB hub device connected to the another peripheral device, reconnecting the another peripheral device to one of the ports, and returning to the step (e).

13. The method of claim 12, after the step (c2), further comprising a step of: (c21) inquire a user whether the another peripheral device is reconnected, if yes, proceed to the step (c3) and if no, proceed to the step (d).

14. The method of claim 12, after the step (f), further comprising the steps of:
   (f1) determining whether the added peripheral device downgrades to a lowest execution mode, if yes, proceed to the step (f2) and if no, proceed to the step (g); and
   (f2) disabling the port connected to the added peripheral device.

15. The method of claim 14, after the step (f2), further comprising the steps of:
   (f3) removing the added peripheral device; and
   (f4) enabling the port connected to the removed added peripheral device.

16. The method of claim 11, after the step (h), further comprising the steps of:
   (h1) checking whether the added peripheral device is removed, if yes, proceed to the step (h2) and if no, continuously perform the step (h1); and
   (h2) enabling the disabled port connected to the removed added peripheral device.

17. The method of claim 11, after the step (h), further comprising the steps of:
   (h1) checking whether a power supplying mode of the added peripheral device is switched, if yes, proceed to the step (h2) and if no, continuously perform the step (h1); and
   (h2) enabling the disabled port connected to the added peripheral device associated with the switched power supplying mode.

18. The method of claim 11, wherein the execution mode is selected from one group consisting of a SuperSpeed mode, a High-Speed mode, a FullSpeed mode and a LowSpeed mode compatible to USB protocol.

19. A dynamic power management method for universal serial bus (USB) hub, which is applicable to a dynamic power management system, wherein the dynamic power management system comprises a host device, a power unit generating a supplying current, a hub device coupled to the host device and the power unit, and the hub device has a power management module, a hub function module and a plurality of ports, the method comprising the steps of:
   (a) activating a USB hub device;
   (b) establishing a communication link between the USB hub device and a host device;
   (c) calculating an available current of the USB hub device based on a supplying current by the power management module;
   (d) detecting whether an added peripheral device is connected to one of a plurality of ports of the USB hub device by the hub function module, if yes, proceed to step (e) and if no, proceed to (d);
   (e) acquiring information regarding a request current of the added peripheral device by the power management module, and wherein the power management module acquires the request current when the USB hub device inquires the host device;
   (f) comparing the available current with the request current by the power management module for determining whether the available current is less than the request current, if yes, proceed to step (g) and if no, proceed to step (h);
   (g) reconnecting the added peripheral device to the one of the ports by the hub function module, downgrading an execution mode of the port connected to the added peripheral device, and returning to the step (e); and
   (h) completing the connection between the added peripheral device and the USB hub device.

20. The method of claim 19, after the step (c), further comprising the steps of:
   (c1) determining whether the available current is increased by the power management module, if yes, proceed to step (c2) and if no, proceed to step (d);
   (c2) checking whether another port of the USB hub device connected to another peripheral device is executed in a downgraded execution mode by the hub function module; and
   (c3) upgrading the downgraded execution mode of another port of the USB hub device connected to the another peripheral device by the hub function module, reconnecting the another peripheral device to one of the ports, and returning to the step (e).

21. The method of claim 19, after the step (f), further comprising the steps of:
(f1) determining whether the added peripheral device downgrades to a lowest execution mode by the hub function module, if yes, proceed to the step (f2) and if no, proceed to the step (g); and
(f2) disabling the port connected to the added peripheral device by the hub function module.

22. The method of claim 21, after the step (f2), further comprising the steps of:
(f3) removing the added peripheral device; and
(f4) enabling the port connected to the removed added peripheral device.

23. The method of claim 22, after the step (h), further comprising the steps of:
(h1) checking whether the added peripheral device is removed, if yes, proceed to the step (h2) and if no, continuously perform the step (h1); and
(h2) enabling the disabled port connected to the removed added peripheral device.

24. The method of claim 19, after the step (h), further comprising the steps of:
(h1) checking whether a power supplying mode of the added peripheral device is switched by the hub function module, if yes, proceed to the step (h2) and if no, continuously perform the step (h1); and
(h2) enabling the disabled port connected to the added peripheral device associated with the switched power supplying mode.

25. The method of claim 19, wherein the execution mode is selected from one group consisting of a SuperSpeed mode, a High-Speed mode, a FullSpeed mode and a LowSpeed mode compatible to USB protocol.

* * * * *